(12) United States Patent
Bae et al.

(10) Patent No.: US 12,305,542 B2
(45) Date of Patent: May 20, 2025

(54) COMBINED POWER GENERATION SYSTEM AND CONTROL METHOD THEREOF

(71) Applicant: DOOSAN ENERBILITY CO., LTD., Changwon (KR)

(72) Inventors: Young Hoon Bae, Changwon (KR); Woo Won Jeon, Changwon (KR); Kwang Hun Jeong, Gimhae (KR)

(73) Assignee: DOOSAN ENERBILITY CO., LTD., Changwon (KR)

( * ) Notice: Subject to any disclaimer, the term of this patent is extended or adjusted under 35 U.S.C. 154(b) by 90 days.

(21) Appl. No.: 18/366,812

(22) Filed: Aug. 8, 2023

(65) Prior Publication Data

US 2024/0175379 A1 May 30, 2024

(30) Foreign Application Priority Data

Nov. 29, 2022 (KR) .................. 10-2022-0163033

(51) Int. Cl.
*F01K 9/04* (2006.01)
*F01K 7/16* (2006.01)
(Continued)

(52) U.S. Cl.
CPC .............. *F01K 9/04* (2013.01); *F01K 7/16* (2013.01); *F01K 19/00* (2013.01); *F01K 23/10* (2013.01)

(58) Field of Classification Search
CPC .................................. F01K 9/04; F01K 19/00
See application file for complete search history.

(56) References Cited

U.S. PATENT DOCUMENTS 10,385,733 B2  8/2019  Gobrecht
11,428,115 B2  8/2022  Frazer
(Continued)

FOREIGN PATENT DOCUMENTS

EP  3258074 A1  12/2017
JP  4503995 B2   7/2010
(Continued)

OTHER PUBLICATIONS

Office Action from Korean Patent Office, dated Aug. 1, 2024.
EP EESR, dated Feb. 16, 2024.

*Primary Examiner* — Jonathan R Matthias
(74) *Attorney, Agent, or Firm* — Harvest IP Law, LLP

(57) ABSTRACT

Disclosed herein is a combined power generation system that includes a heat recovery steam generator configured to recover exhaust heat from a gas turbine to produce steam and including a high-pressure superheater and a reheater, a steam turbine operated by receiving the produced steam and including a high-pressure turbine, a medium-pressure turbine, and a low-pressure turbine, a condenser installed under the low-pressure turbine to condense steam, a high-pressure steam line for supplying the high-pressure turbine with the steam produced by the high-pressure superheater, a medium-pressure steam line for supplying the medium-pressure turbine with the steam that has passed through the high-pressure turbine, a high-pressure bypass line connected from the high-pressure steam line to the medium-pressure steam line, a reheat steam bypass line connected from downstream of the medium-pressure steam line to the condenser, and an additional high-pressure bypass line connected from the high-pressure steam line to the condenser.

5 Claims, 3 Drawing Sheets

(51) Int. Cl.
  *F01K 19/00*   (2006.01)
  *F01K 23/10*   (2006.01)

(56) References Cited

U.S. PATENT DOCUMENTS

| | | | | |
|---|---|---|---|---|
| 2007/0113562 A1* | 5/2007 | Tomlinson | ............ | F01K 23/101 |
| | | | | 60/39.182 |
| 2009/0158738 A1* | 6/2009 | Hu | ........................ | F01K 23/108 |
| | | | | 60/646 |
| 2012/0233978 A1* | 9/2012 | Chillar | ................... | F01K 13/02 |
| | | | | 219/629 |
| 2015/0113988 A1 | 4/2015 | Ichinose | | |
| 2017/0152762 A1 | 6/2017 | Murakami | | |

FOREIGN PATENT DOCUMENTS

| | | | |
|---|---|---|---|
| JP | 2013502538 | A | 1/2013 |
| JP | 5638237 | B2 | 12/2014 |
| JP | 5734792 | B2 | 6/2015 |
| JP | 2020084947 | A | 6/2020 |
| JP | 2022123455 | A | 8/2022 |
| KR | 10-0417202 | B1 | 4/2004 |
| KR | 10-1753526 | B1 | 7/2017 |
| KR | 102196876 | B1 | 12/2020 |

* cited by examiner

COMBINED POWER GENERATION SYSTEM AND CONTROL METHOD THEREOF

CROSS-REFERENCE TO RELATED APPLICATION

This application claims priority to Korean Patent Application No. 10-2022-0163033, filed on Nov. 29, 2022, the disclosure of which is incorporated herein by reference in its entirety.

BACKGROUND

Technical Field

Exemplary embodiments relate to a combined power generation system and a control method thereof, and more particularly, to a combined power generation system including an additional high-pressure bypass line connected from a high-pressure steam line to a condenser, and a control method thereof.

Related Art

A combined power plant includes a gas turbine that generates power by burning fuel, a heat recovery steam generator that produces steam by recovering exhaust heat from the gas turbine, and a steam turbine that uses the steam supplied from the heat recovery steam generator to generate power.

A conventional combined power generation system includes a high-pressure steam line for supplying a high-pressure turbine with steam produced by a high-pressure superheater, a medium-pressure steam line for supplying a medium-pressure turbine with the steam that has passed through the high-pressure turbine, a high-pressure bypass line connected from the high-pressure steam line to the medium-pressure steam line, and a reheat steam bypass line connected from downstream of the medium-pressure steam line to a condenser.

When rapidly starting the combined power generation system, there is a significant increase in the amount of steam produced by the heat recovery steam generator.

Hence, the excessive steam production can lead to the reheat steam pressure becoming uncontrollable, which may impede the rapid startup of the system itself.

In addition, if the reheat steam bypass capacity is increased to manage overproduced steam, it can result in a decrease in steam density and subsequently reduce the efficiency of steam discharge. This, in turn, leads to high treatment costs.

SUMMARY

Aspects of one or more exemplary embodiments provide a combined power generation system and a control method thereof, which are capable of reducing a startup time of a combined power plant by including an additional high-pressure bypass line and valve provided between a high-pressure steam line and a condenser of a steam turbine to increase an effect of steam discharge, facilitate pressure control, and ensure system stability.

Additional aspects will be set forth in part in the description which follows and, in part, will become apparent from the description, or may be learned by practice of the exemplary embodiments.

According to an aspect of an exemplary embodiment, there is provided a combined power generation system that includes a heat recovery steam generator configured to recover exhaust heat from a gas turbine to produce steam, the heat recovery steam generator including a high-pressure superheater and a reheater, a steam turbine operated by receiving the produced steam, the steam turbine including a high-pressure turbine, a medium-pressure turbine, and a low-pressure turbine, a condenser installed under the low-pressure turbine to condense steam, a high-pressure steam line for supplying the high-pressure turbine with the steam produced by the high-pressure superheater, a medium-pressure steam line for supplying the medium-pressure turbine with the steam that has passed through the high-pressure turbine, a high-pressure bypass line connected from the high-pressure steam line to the medium-pressure steam line, and an additional high-pressure bypass line connected from the high-pressure steam line to the condenser.

The combined power generation system may further include a reheat steam bypass line connected from downstream of the medium pressure steam line to the condenser. The combined power generation system may further include a high-pressure bypass valve provided in the high-pressure bypass line, a reheat steam bypass valve provided in the reheat steam bypass line, and an additional high-pressure bypass valve provided in the additional high-pressure bypass line.

A capacity of the additional high-pressure bypass line may be determined by obtaining a product of density and sound speed under design pressure and temperature conditions and then multiplying a reciprocal of the product by a design flux to derive a reference cross-sectional area, by obtaining a product of density and sound speed under steam turbine pressure and temperature conditions required at startup and then multiplying this product by the reference cross-sectional area to derive an amount of steam that is able to be discharged at startup, and by obtaining a difference in the amount of steam that is able to be discharged from the high-pressure bypass line and from the reheat steam bypass line and then multiplying the difference by a ratio of a design condition flux of the high-pressure bypass line and a discharge flux at startup.

When the reference cross-sectional area is derived, in the high-pressure bypass line, a maximum cross-sectional area may be obtained by dividing a design flux by a maximum steam flux per unit area and dividing the same by a valve position at the time of design, and in the reheat steam bypass line, a maximum cross-sectional area may be obtained by dividing a design flux by a maximum steam flux per unit area and dividing the same by a valve position at the time of design.

When the amount of steam that is able to be discharged at startup is derived, in the high-pressure bypass line, under conditions at startup, a steam flux may be calculated by multiplying a maximum steam flux per unit area by the reference cross-sectional area, and in the reheat steam bypass line, under conditions at startup, a steam flux may be calculated by multiplying a maximum steam flux per unit area by the reference cross-sectional area.

When the capacity of the additional high-pressure bypass line is determined, for conversion into design conditions, the difference in the amount of steam that is able to be discharged from the high-pressure bypass line and from the reheat steam bypass line may be multiplied by the ratio of the design condition flux and the discharge flux at startup, and the capacity of the additional high-pressure bypass line may be designed to be a maximum valve position by dividing the design condition flux by a valve position at the time of design.

According to an aspect of another exemplary embodiment, there is provided a method for controlling a combined power generation system that includes a heat recovery steam generator including a high-pressure superheater and a reheater, a steam turbine including a high-pressure turbine, a medium-pressure turbine, and a low-pressure turbine, a condenser, a high-pressure steam line, a medium-pressure steam line, a high-pressure bypass line, a high-pressure bypass valve, a reheat steam bypass line, a reheat steam bypass valve, an additional high-pressure bypass line connected from the high-pressure steam line to the condenser, and an additional high-pressure bypass valve installed in the additional high-pressure bypass line, the method including controlling the additional high-pressure bypass valve to operate when a valve position of the reheat steam bypass valve is equal to or greater than a predetermined value.

A reheat steam pressure in the medium-pressure steam line may be a process variable for system control, a steam pressure required for the medium-pressure turbine may be a target set point for system control, and a valve position of the additional high-pressure bypass valve may be a manipulated variable.

A control signal of the reheat steam bypass valve may be set as an enable trigger signal of the additional high-pressure bypass valve, and the enable trigger may be set when the valve position of the reheat steam bypass valve is between 85% and 95%.

A disable trigger signal of the additional high-pressure bypass valve may be set to be 5 to 15% less than the valve position at the enable trigger signal.

It is to be understood that both the foregoing general description and the following detailed description of exemplary embodiments are exemplary and explanatory and are intended to provide further explanation of the disclosure as claimed.

BRIEF DESCRIPTION OF THE DRAWINGS

The above and other aspects will become more apparent from the following description of the exemplary embodiments with reference to the accompanying drawings, in which.

DETAILED DESCRIPTION

Figure 1:
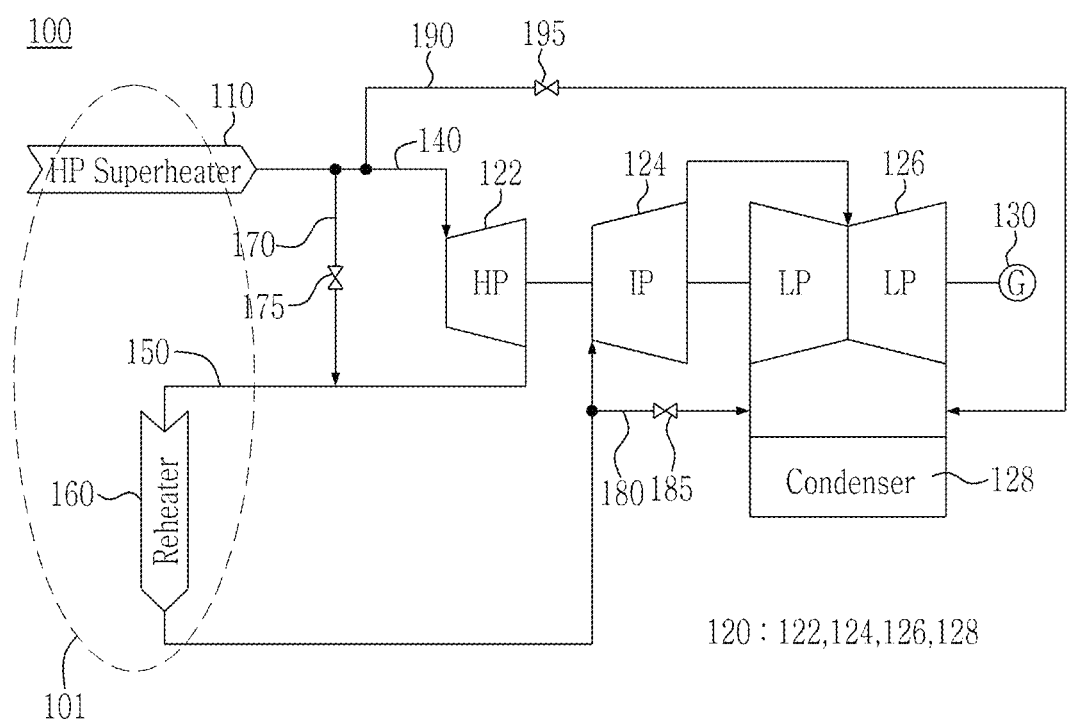
FIG. 1 is a configuration diagram illustrating a combined power generation system according to an exemplary embodiment of the present disclosure.

Various modifications and different embodiments will be described below in detail with reference to the accompanying drawings so that those skilled in the art can easily carry out the disclosure. It should be understood, however, that the present disclosure is not intended to be limited to the specific embodiments, but the present disclosure includes all modifications, equivalents or replacements that fall within the spirit and scope of the disclosure as defined in the following claims.

The terminology used herein is for the purpose of describing specific embodiments only and is not intended to limit the scope of the disclosure. As used herein, the singular forms "a", "an" and "the" are intended to include the plural forms as well, unless the context clearly indicates otherwise. In the disclosure, terms such as "comprises", "includes", or "have/has" should be construed as designating that there are such features, integers, steps, operations, components, parts, and/or combinations thereof, not to exclude the presence or possibility of adding of one or more of other features, integers, steps, operations, components, parts, and/or combinations thereof.

Exemplary embodiments will be described below in detail with reference to the accompanying drawings. It should be noted that like reference numerals refer to like parts throughout various drawings and exemplary embodiments. In certain embodiments, a detailed description of functions and configurations well known in the art may be omitted to avoid obscuring appreciation of the disclosure by those skilled in the art. For the same reason, some components may be exaggerated, omitted, or schematically illustrated in the accompanying drawings.

FIG. 1 is a configuration diagram illustrating a combined power generation system according to an exemplary embodiment.

The combined power generation system, which is designated by reference numeral 100, according to an embodiment of the present disclosure, includes a heat recovery steam generator 101, a steam turbine 120, a condenser 128, a high-pressure steam line 140, a medium-pressure steam line 150, a high-pressure bypass line 170, a reheat steam bypass line 180, and an additional high-pressure bypass line 190. The heat recovery steam generator 101 recovers exhaust heat from a gas turbine to produce steam and includes a high-pressure superheater 110 and a reheater 160. The steam turbine 120 is operated by receiving the produced steam and includes a high-pressure turbine 122, a medium-pressure turbine 124, and a low-pressure turbine 126. The condenser 128 is installed under the low-pressure turbine 126 to condense steam. The high-pressure steam line 140 supplies the high-pressure turbine 122 with the steam produced by the high-pressure superheater 110. The medium-pressure steam line 150 supplies the medium-pressure turbine 124 with the steam that has passed through the high-pressure turbine 122. The high-pressure bypass line 170 is connected from the high-pressure steam line 140 to the medium-pressure steam line 150. The reheat steam bypass line 180 is connected from downstream of the medium-pressure steam line 150 to the condenser 128. The additional high-pressure bypass line 190 is connected from the high-pressure steam line 140 to the condenser 128.

A combined power plant includes a gas turbine (not shown) that generates power by burning fuel, a heat recovery steam generator 101 that produces steam by recovering exhaust heat from the gas turbine, and a steam turbine 120 that uses the steam supplied from the heat recovery steam generator to generate power.

The heat recovery steam generator (HRSG) 101 includes the high-pressure superheater 110 and the reheater 160 as illustrated in FIG. 1. The high-pressure superheater 110 may produce superheated steam by exchanging heat with the exhaust gas of the gas turbine and supply the superheated steam to the high-pressure turbine 122. The reheater 160 may reheat the steam that has passed through the high-pressure turbine 122 by exchanging heat with the exhaust gas of the gas turbine and supply the steam to the medium-pressure turbine 124.

The steam turbine 120 may include the high-pressure turbine 122, the medium-pressure turbine 124, and the low-pressure turbine 126, which are connected by a rotary shaft. The rotary shaft of the steam turbine 120 may be connected to a generator 130 to generate electric power by rotating the generator 130. The high-pressure turbine 122 may be operated by receiving the steam produced by the high-pressure superheater 110 through the high-pressure steam line 140. The medium-pressure turbine 124 may be operated by receiving, through the medium-pressure steam line 150, the steam reheated by the reheater 160 connected to the medium-pressure steam line 150. The low-pressure turbine 126 may be operated by receiving the steam that has passed through the medium-pressure turbine 124. The condenser 128 may be installed under the low-pressure turbine 126 to condense steam that has passed through or bypassed the steam turbine 120.

The high-pressure steam line 140 is a main pipe used to supply steam produced by the high-pressure superheater 110 to the steam turbine 120. The high-pressure bypass line 170 and the additional high-pressure bypass line 190 may be connected to the middle of the high-pressure steam line 140.

The medium-pressure steam line 150 is connected from the high-pressure turbine 122 to the medium-pressure turbine 124 via the reheater 160 of the heat recovery steam generator 101. This connection facilitates the supply of reheated steam to the medium-pressure turbine 124. The high-pressure bypass line 170 may be connected to upstream of the medium-pressure steam line 150, and the reheat steam bypass line 180 may be connected downstream of the medium-pressure steam line 150. The reheater 160 may be disposed between the upstream of the medium-pressure steam line 150 where the high-pressure bypass line 170 is connected to and the downstream of the medium-pressure steam line 150 where the reheat steam bypass line 180 is connected to.

When a large amount of steam is produced by the high-pressure superheater 110, such as during startup of the gas turbine, the high-pressure bypass line 170 may allow some of the steam to bypass to the medium-pressure steam line 150. The steam that have bypassed may be combined with steam that has passed through the high-pressure turbine 122 in the medium-pressure steam line 150, and may be reheated by the reheater 160 to be supplied to the medium-pressure turbine 124.

When a large amount of steam is reheated by the reheater 160, the reheat steam bypass line 180 may allow some of the steam to be directly sent to the condenser 128.

When an excessive amount of steam is produced during rapid startup of the gas turbine that surpasses the capacity of the high-pressure bypass line 170, the additional high-pressure bypass line 190 can be utilized. The additional high-pressure bypass line 190 enables a portion of the steam produced by the high-pressure superheater 110 to be directly directed to the condenser 128. The additional high-pressure bypass line 190 may be connected to the high-pressure steam line 140 at a location downstream from the point where the high-pressure bypass line 170 is connected to the high-pressure steam line 140.

The combined power generation system 100 according to the present embodiment may further include a high-pressure bypass valve 175 provided in the high-pressure bypass line 170, a reheat steam bypass valve 185 provided in the reheat steam bypass line 180, and an additional high-pressure bypass valve 195 provided in the additional high-pressure bypass line 190.

The high-pressure bypass valve 175 may adjust a valve position thereof or its opening degree to regulate or adjust the amount of steam that bypasses through the high-pressure bypass line 170.

The reheat steam bypass valve 185 may adjust a valve position thereof or its opening degree to regulate or adjust the amount of steam that bypasses through the reheat steam bypass line 180.

The additional high-pressure bypass valve 195 may adjust a valve position thereof or its opening degree to regulate or adjust the amount of steam that bypasses through the additional high-pressure bypass line 190. The valve position or the opening of the additional high-pressure bypass valve 195 may be adjusted depending on the valve position or the opening of the high-pressure bypass valve 175 and the valve position or the opening of the reheat steam bypass valve 185.

Figure 2:
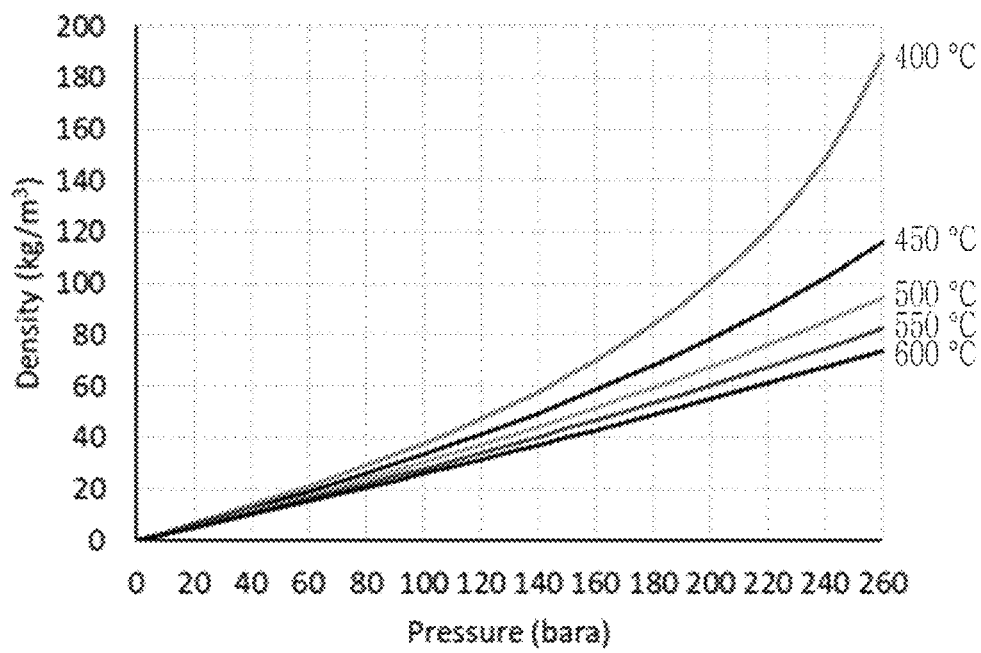
FIG. 2 is a graph illustrating a change in density with pressure for each temperature of steam.
Figure 3:
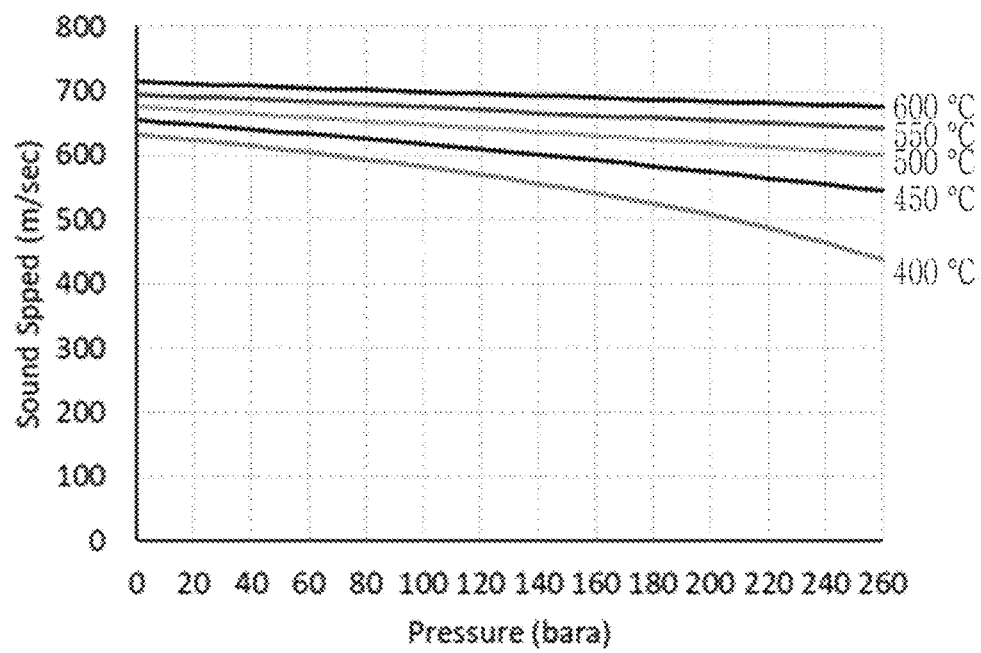
FIG. 3 is a graph illustrating a change in sound speed with pressure for each temperature of steam.
Figure 4:
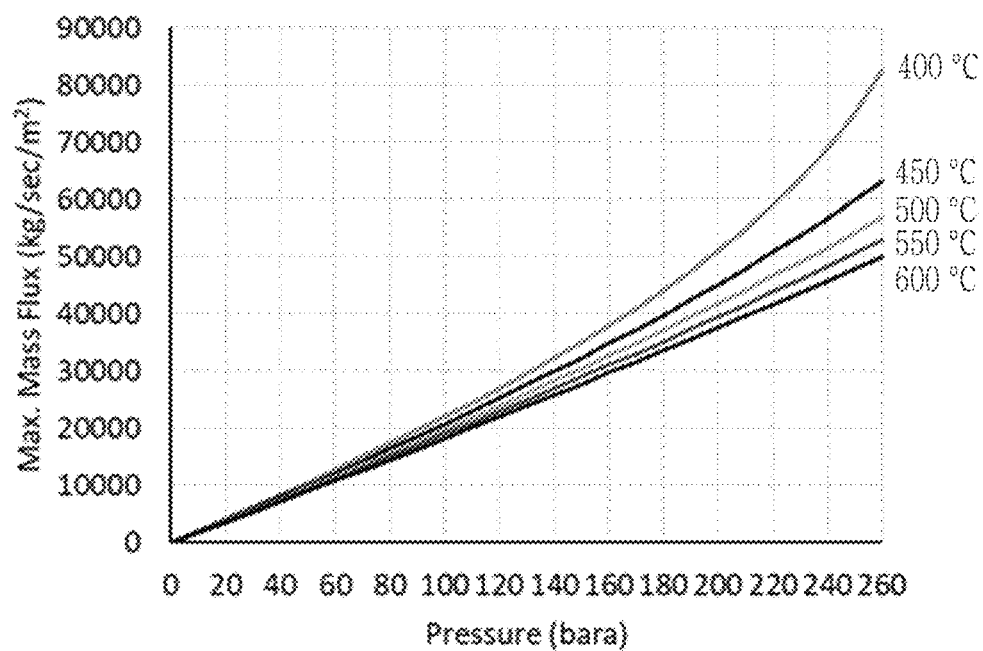
FIG. 4 is a graph illustrating a change in maximum mass flux per unit area with pressure for each temperature of steam.

FIG. 2 is a graph illustrating a change in density with pressure for each temperature of steam. FIG. 3 is a graph illustrating a change in sound speed with pressure for each temperature of steam. FIG. 4 is a graph illustrating a change in maximum mass flux per unit area with pressure for each temperature of steam.

The purpose and configuration of the additional high-pressure bypass line 190, as well as how to determine the steam treatment capacity thereof, will be described with reference to FIGS. 1 to 4.

The capacity of the additional high-pressure bypass line 190 may be determined by obtaining a product of density and sound speed under design pressure and temperature conditions and then multiplying a reciprocal of the product by a design flux to derive a reference cross-sectional area, by obtaining a product of density and sound speed under steam turbine pressure and temperature conditions required at startup and then multiplying this product by the reference cross-sectional area to derive an amount of steam that is able to be discharged at startup, and by obtaining a difference in the amount of steam that is able to be discharged from the high-pressure bypass line 170 and from the reheat steam bypass line 180 and then multiplying the difference by a ratio of a design condition flux of the high-pressure bypass line 170 and a discharge flux at startup.

As illustrated in FIG. 2, steam increases in density as the pressure thereof increases at a certain temperature. That is, the density and pressure of steam are statically correlated. Also, steam decreases in density as the temperature thereof increases at a certain pressure. Furthermore, it has been observed that the higher the temperature of steam is, the greater the linearity of the static correlation between the density and pressure of steam becomes. In other words, it can be seen that the curve in the graph of FIG. 2 becomes closer to a straight line as the temperature of the steam becomes closer toward 600° C., compared to 400° C.

As illustrated in FIG. 3, steam decreases in sound speed when the pressure thereof increases at a certain temperature. That is, the pressure and sound speed of steam are negatively correlated. Also, steam increases in sound speed as the temperature thereof increases at a certain pressure. Furthermore, it is found that the higher the temperature of steam is, the greater the linearity of the negative correlation between the sound speed and pressure of steam becomes. In other words, it can be seen that the curve in the graph of FIG. 3 becomes closer to a straight line as the temperature of the steam becomes closer toward 600° C. compared to 400° C.

Since the steam turbine generally requires a temperature of 450° C. or higher during rapid startup, the correlation between the density and pressure of the steam and the correlation between the sound speed and the temperature of the steam can be considered approximately linear as seen in the graphs of FIGS. 2 and 3. It can be seen that the range of change in steam density with the change in steam pressure is relatively larger than the range of change in steam sound speed with the change in steam pressure.

As illustrated in FIG. 4, the maximum mass flux of steam that is able to pass per unit area increases as the pressure of steam increases at a certain temperature. Also, steam decreases in maximum mass flux as the temperature thereof increases at a certain pressure. Furthermore, the higher the temperature of steam is, the greater the linearity of the static correlation between the maximum mass flux and pressure of steam becomes. In other words, it can be seen that the curve in the pressure-maximum mass flux graph of FIG. 4 becomes closer to a straight line as the temperature of the steam becomes closer toward 600° C. compared to 400° C.

The flow velocity of steam is equal to the sound speed of steam during choking flow (when choking occurs). Therefore, the maximum mass flux of steam that is able to pass per unit area may be expressed as a product of density and sound speed, as shown in Equation 1 below.

$$G = \frac{\dot{m}}{A} = \frac{\rho A V}{A} = \rho V \rightarrow G_{max} = \rho \times C \quad \text{[Equation 1]}$$

That is, since the mass flux (G) is a product of density ($\rho$) and flow velocity (V), the maximum steam flux ($G_{max}$) per unit area may be calculated from the product of density ($\rho$) and sound speed (C). As the pressure of steam increases, the discharge effect of steam increases.

Considering these physical characteristics, in treating overproduced steam, it is more effective to connect a bypass line capable of diverting steam from the high-pressure steam line 140 with high steam pressure directly to the condenser, rather than routing the steam from the medium-pressure steam line 150 to the condenser. Hence, in the present embodiment, the additional high-pressure bypass line 190 is directly connected from the high-pressure steam line 140 to the condenser 128.

Based on these physical behavior characteristics, the capacities of the additional high-pressure bypass line 190 and the additional high-pressure bypass valve 195 are selected as follows.

$$G_{max,HP} = \rho_{HP@Design} \times C_{HP@Design} \rightarrow A_{HP@VPON_{HP\,full}} = \frac{\dot{m}_{HP@design}}{C_{max,HP}} \times \frac{1}{VPOS_{HP,Design}} \quad \text{[Equation 2]}$$

$$G_{max,IP} = \rho_{IP@Design} \times C_{IP@Design} \rightarrow A_{IP@VPON_{IP\,full}} = \frac{\dot{m}_{IP@design}}{C_{max,IP}} \times \frac{1}{VPOS_{IP,Design}} \quad \text{[Equation 3]}$$

As described in Equation 2, the maximum steam flux ($G_{max.HP}$) of the high-pressure bypass line 170 is a product of density ($\rho$) and sound speed (C) under design pressure and temperature conditions. Thus, the reference cross-sectional area (A) may be obtained by dividing a design flux ($\dot{m}$) by the maximum steam flux ($G_{max.HP}$) per unit area. In this case, the maximum cross-sectional area may be obtained by dividing the above value by a valve position (VPOS) at the time of design.

As described in Equation 3, the maximum steam flux ($G_{max.IP}$) of the reheat steam bypass line 180 is a product of density ($\rho$) and sound speed (C) under design pressure and temperature conditions. Thus, the reference cross-sectional area (A) may be obtained by dividing a design flux ($\dot{m}$) by the maximum steam flux ($G_{max.IP}$) per unit area. In this case, the maximum cross-sectional area may be obtained by dividing the above value by a valve position (VPOS) at the time of design.

Next, how to calculate the amount of steam that is able to be discharged at startup will be described.

$$\dot{m}_{HP@start-up} = \rho_{HP@start-up} \times C_{HP@start-up} \times A_{HP@VPOS_{HP\,full}} \quad \text{[Equation 4]}$$

$$\dot{m}_{IP@start-up} = \rho_{IP@start-up} \times C_{IP@start-up} \times A_{IP@VPOS_{IP\,full}} \quad \text{[Equation 5]}$$

As described in Equation 4, the steam flux at startup ($\dot{m}$) in the high-pressure bypass line 170 may be calculated by multiplying a maximum steam flux ($\rho \times C$) per unit area by a reference cross-sectional area (A).

As described in Equation 5, the steam flux at startup ($\dot{m}$) in the high-pressure bypass line 180 may be calculated by multiplying a maximum steam flux ($\rho \times C$) per unit area by a reference cross-sectional area (A).

Next, how to determine the capacity of the additional high-pressure bypass line 190 will be described.

$$\dot{m}_{AdditionalHP@Design,VPON_{full}} = (\dot{m}_{HP@start-up} - \dot{m}_{LP@start-up}) \times \frac{\dot{m}_{HP@design}/VPOS_{HP,Design}}{\dot{m}_{HP@start-up}} \quad \text{[Equation 6]}$$

As described in Equation 6, the capacity additionally required for the additional high-pressure bypass line 190 is determined by obtaining a difference between a steam flux at startup ($\dot{m}$) in the high-pressure bypass line and a steam flux at startup ($\dot{m}$) in the reheat steam bypass line.

For conversion into design conditions, the difference may be multiplied by a design condition flux ($\dot{m}$) and a discharge flux at startup ($\dot{m}$). In addition, the capacity of the additional high-pressure bypass line 190 may be designed to be a maximum valve position by dividing the design condition flux ($\dot{m}$) by a valve position (VPOS) at the time of design. Thus, the additional high-pressure bypass valve 195 may be designed to be fully (100%) open.

As such, the combined cycle system of the present embodiment can be efficiently configured by accurately calculating and designing the steam treatment capacity of the additional high-pressure bypass line.

Figure 5:
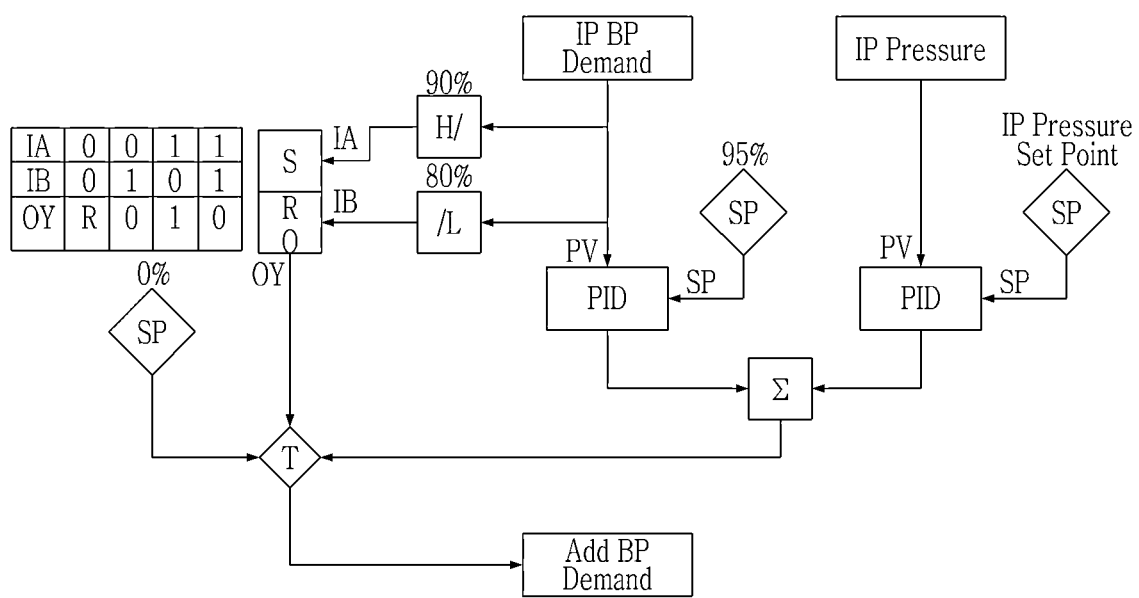
FIG. 5 is a configuration diagram illustrating a method for controlling a combined power generation system according to another exemplary embodiment.

FIG. 5 is a configuration diagram illustrating a method for controlling a combined power generation system according to another exemplary embodiment of the present disclosure.

The method for controlling a combined power generation system according to another exemplary embodiment of the present disclosure will be described with reference to FIG. 5.

As described above, the combined power generation system 100 according the exemplary embodiment includes the heat recovery steam generator 101, the steam turbine 120, the condenser 128, the high-pressure steam line 140, the medium-pressure steam line 150, the high-pressure bypass line 170, the high-pressure bypass valve 175, the reheat steam bypass line 180, the reheat steam bypass valve 185, the additional high-pressure bypass line 190. The heat recovery steam generator 101 includes the high-pressure superheater 110 and the reheater 160. The steam turbine 120 includes the high-pressure turbine 122, the medium-pressure turbine 124, and the low-pressure turbine 126. The additional high-pressure bypass line 190 is connected from the high-pressure steam line to the condenser. The additional high-pressure bypass valve 195 is installed in the additional high-pressure bypass line 190.

The method for controlling a combined power generation system may control the additional high-pressure bypass valve 195 to operate when the valve position of the reheat steam bypass valve 185 is equal to or greater than a predetermined value.

The reheat steam pressure in the medium-pressure steam line 150 may be a process variable for system control, the steam pressure required for the medium-pressure turbine 124 may be a target set point for system control, and the valve position of the additional high-pressure bypass valve 195 may be a manipulated variable.

That is, when the reheat steam pressure in the medium-pressure steam line 150 is set as a process variable, the steam pressure required for the medium-pressure turbine 124, which is a target set point, may be within a predetermined value range and the valve position of the additional high-pressure bypass valve 195 may be manipulated and adjusted. When the valve position of the reheat steam bypass valve 185 reaches or exceeds than a predetermined value, the additional high-pressure bypass valve 195 may be activated to increase its valve position.

According to an embodiment, the control signal of the reheat steam bypass valve 185 can be used as the enable trigger signal for the additional high-pressure bypass valve 195. For example, the enable trigger signal may be set when the valve position of the reheat steam bypass valve 185 falls within the range of 85% and 95%. This allows the activation of the additional high-pressure bypass valve 195 when the valve position of the reheat steam bypass valve 185 meets this specific condition.

In addition, the control signal of the reheat steam bypass valve 185 can be used as the disable trigger signal for the additional high-pressure bypass valve 195. For example, the disable trigger signal may be set when the valve position of the reheat steam bypass valve 185 falls within the range of 5% to 15%, less than the valve position at the enable trigger signal. This allows the deactivation of the additional high-pressure bypass valve 195 when the valve position of the reheat steam bypass valve 185 meets this specific condition.

As illustrated in FIG. 5, in order to minimize the capacity of the additional high-pressure bypass valve 195 in terms of cost reduction, according to an embodiment, the additional high-pressure bypass valve 195 is preferably operated when the valve position of the reheat steam bypass valve 185 is equal to or greater than a predetermined value. Accordingly, the operation of the additional high-pressure bypass valve 195 may be controlled by setting the control signal of the reheat steam bypass valve 185 as a trigger signal.

In FIG. 5, PID control may be performed by setting the reheat steam pressure (IP Pressure) in the medium-pressure steam line 150 as a process variable and setting the steam pressure (IP Pressure) required for the medium-pressure turbine 124 as a target set point for system control.

In addition, the PID control may be performed by setting the steam pressure (IP BP Demand) required for the reheat steam bypass line 180 and the target set point (SP) for the valve position of the reheat steam bypass valve 185 to be 95%.

The enable trigger signal of the additional high-pressure bypass valve 195 may be set when the control signal of the reheat steam bypass valve 185 is about 90% open.

In order to stably operate the additional high-pressure bypass valve 195, the disable trigger signal of the additional high-pressure bypass valve 195 may be set when the control signal of the reheat steam bypass valve 185 is about 80% open, which is less by about 10%.

The PID control value using the valve position of the reheat steam bypass valve as a trigger signal and the PID control value using the reheat steam pressure as a process variable may be combined with different weights (for example, at a weight of 1:0.5).

Finally, it is possible to accurately control the valve position (Add BP Demand) of the additional high-pressure bypass valve 195, which is a manipulated variable.

As is apparent from the above description, it is evident that the combined power generation system and its control method according to the present disclosure offer several advantages. According to the combined power generation system and the control method, by incorporating the additional high-pressure bypass line and valve provided between the high-pressure steam line and the condenser of the steam turbine, it is possible to reduce the startup time of the combined power plant. This addition also enhances the effectiveness of steam discharge, facilitate pressure control, and ensure system overall system stability.

While one or more exemplary embodiments have been described with reference to the accompanying drawings, it will be apparent to those skilled in the art that various variations and modifications may be made by adding, changing, or removing components without departing from the spirit and scope of the disclosure as defined in the appended claims, and these variations and modifications fall within the spirit and scope of the disclosure as defined in the appended claims.

What is claimed is:

1. A combined power generation system comprising:
   a heat recovery steam generator configured to recover exhaust heat from a gas turbine to produce steam, the heat recovery steam generator comprising a high-pressure superheater and a reheater;
   a steam turbine operated by receiving the produced steam, the steam turbine comprising a high-pressure turbine, a medium-pressure turbine, and a low-pressure turbine;
   a condenser installed under the low-pressure turbine to condense the steam;
   a high-pressure steam line for supplying the high-pressure turbine with the steam produced by the high-pressure superheater;
   a medium-pressure steam line for supplying the medium-pressure turbine with the steam that has passed through the high-pressure turbine;
   a high-pressure bypass line connected from the high-pressure steam line to the medium-pressure steam line;
   a reheat steam bypass line connected from downstream of the medium-pressure steam line to the condenser, and
   an additional high-pressure bypass line connected from the high-pressure steam line to the condenser,
   wherein the additional high-pressure bypass line has a physical capacity which is equal to a value determined by:
   multiplying a difference in the amount of steam that is able to be discharged from the high-pressure bypass line and from the reheat steam bypass line, by a ratio of a design condition flux of the high-pressure bypass line and a discharge flux at startup, and wherein the amount of steam is calculated by multiplying a reference cross-sectional area derived by multiplying a reciprocal of a product of density and sound speed under design pressure and temperature conditions by a design flux, and a product of density and sound speed under steam turbine pressure and temperature conditions required at startup.

2. The combined power generation system according to claim 1, further comprising:

a high-pressure bypass valve provided in the high-pressure bypass line;

a reheat steam bypass valve provided in the reheat steam bypass line; and an additional high-pressure bypass valve provided in the additional high-pressure bypass line.

3. The combined power generation system according to claim 2, wherein when the reference cross-sectional area is derived, in the high-pressure bypass line, a maximum cross-sectional area is obtained by dividing a design flux by a maximum steam flux per unit area and dividing the same by a valve position at the time of design, and in the reheat steam bypass line, a maximum cross-sectional area is obtained by dividing a design flux by a maximum steam flux per unit area and dividing the same by a valve position at the time of design.

4. The combined power generation system according to claim 2, wherein when the amount of steam that is able to be discharged at startup is derived, in the high-pressure bypass line, under conditions at startup, a steam flux is calculated by multiplying a maximum steam flux per unit area by the reference cross-sectional area, and in the reheat steam bypass line, under conditions at startup, a steam flux is calculated by multiplying a maximum steam flux per unit area by the reference cross-sectional area.

5. The combined power generation system according to claim 2, wherein when the capacity of the additional high-pressure bypass line is determined, for conversion into design conditions, the difference in the amount of steam that is able to be discharged from the high-pressure bypass line and from the reheat steam bypass line is multiplied by the ratio of the design condition flux and the discharge flux at startup, and the capacity of the additional high-pressure bypass line is designed to be a maximum valve position by dividing the design condition flux by a valve position at the time of design.

* * * * *